May 20, 1924.
V. MOORE
AEROPLANE WING STRUCTURE
Filed June 5, 1922    2 Sheets-Sheet 1
1,495,029
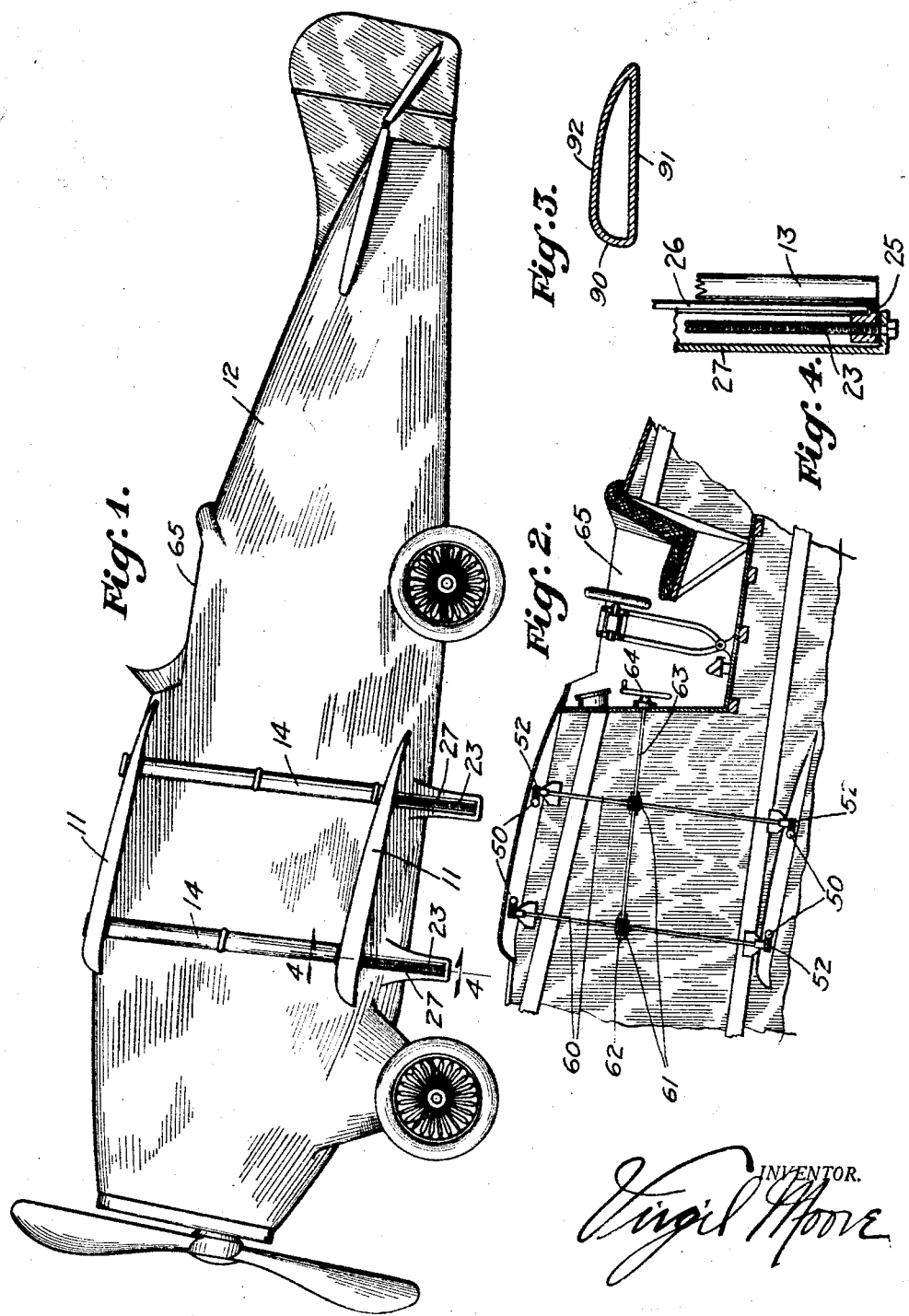

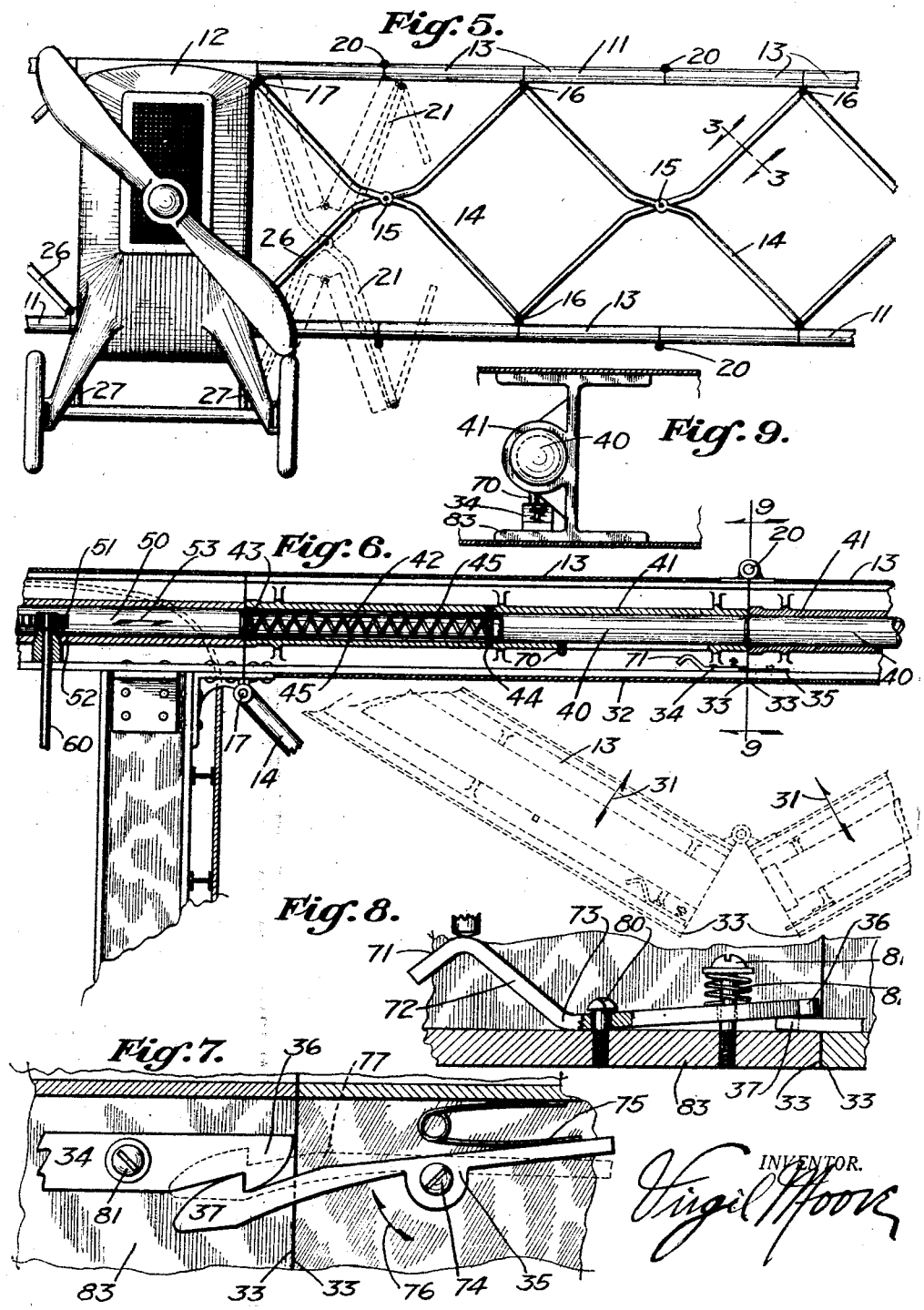

Patented May 20, 1924.

1,495,029

UNITED STATES PATENT OFFICE.

VIRGIL MOORE, OF LOS ANGELES, CALIFORNIA.

AEROPLANE-WING STRUCTURE.

Application filed June 5, 1922. Serial No. 566,177.

*To all whom it may concern:*

Be it known that I, VIRGIL MOORE, a citizen of the United States, residing at Los Angeles, in the county of Los Angeles and State of California, have invented new and useful Improvements in Aeroplane-Wing Structures, of which the following is a specification.

The object of my invention is to provide an aeroplane wing which will be detractable, and the operation of which may be accomplished from the cock-pit of the aeroplane, and also to provide a means by which said detractable wings may be securely locked when in an extended position. These and other objects will become evident in the following statements of the specification.

With reference to the drawings which are for illustrative purposes only in this presentation of the embodiment of my invention, Fig. 1 is a side view of an aeroplane equipped with a preferred form of my folding wings.

Fig. 2 is a fragmentary sectional view taken through cock-pit and point of juncture of wing with fuselage of the aeroplane shown in Fig. 1.

Fig. 3 is a section through one of the crossed struts and taken upon the line 3—3 in Fig. 5.

Fig. 4 is a fragmentary sectional view of wing operating mechanism taken upon the line 4—4 in Fig. 1, and looking in the direction of the appended arrows.

Fig. 5 is a partial front view of the aeroplane shown in Fig. 1.

Fig. 6 is a fragmentary sectional view of the upper wing and a portion of the fuselage showing their juncture and the adjacent structure.

Fig. 7 is a plan view of the catch used in connection with the mechanism provided for the locking of the wing structure.

Fig. 8 is an elevation of the catch shown in Fig. 7.

Fig. 9 is a sectional view showing a preferred type of spar used in my aerofoil construction and taken upon the line 9—9.

Similar numerals refer to similar parts throughout the several views.

The aerofoils 11, as in standard practice of aeroplane construction, extend laterally from the fuselage 12 at a position that will bring the center of lift coincident with the center of gravity post of the entire structure. These aerofoils are divided into sections 13 which are supported by the crossed struts 14, which are joined at their centers 15 and at their extremities are hinged together and connected to the aerofoil sections at the hinges 16. The entire wing structure is joined to the fuselage 12 by the hinged joints 17. The hinges 20 are placed to connect the aerofoil sections between their points of junction with the crossed struts, and are of a necessity placed oppositely from the hinges 16 in order that they may fold between the struts as shown by the dotted line portion 21 of Fig. 5, as the struts are brought back against the fuselage. This action is accomplished by the screws 23, upon which operate the blocks 24 is controlled by the slides 27 in which they act. As the block is lowered in the slide 27 the crossed strut members turn about the hinges 15 and pass through the position indicated at 21 and assume their respective positions against the sides of the fuselage.

The struts I use are of the section shown in Fig. 3. The rounded nose 90 forms the leading edge, the lower side 91 being approximately flat, and the upper side 92 being convexly curved and tapering with relation to the lower side 91, provide the purpose of minimizing the head resistance and making its action that of an aerofoil to compensate for the parasitic resistance that may be incurred. In the present type of aeroplane construction cables and guy wires are extensively used, and due to their vibration while traveling at a high rate of speed, form a source of resistance which I overcome by the use of rigid structure. This type of structure is as adaptable for use in non-folding wing construction as for the folding purposes to which I have put it, having the additional feature of greater strength than the present type of construction.

The locking of the aerofoils in position for flight is accomplished in the following manner: As the crossed struts are extended the aerofoil sections 13 are carried through the position 30 as indicated in Fig. 6, and by this movement a momentum in the direction of the arrows 31 carries the aerofoil sections abruptly into the position of alignment 32. With this action the edges 33 come into contact and the preliminary catch plates 34 and 35 having hooked ends 36 and 37 are brought into active service as shown in Fig. 7, thus holding the aerofoil sections in alignment preparatory to the rigid locking of same. For the purpose of locking, the bolts 40 which are contained in the slides 41, are provided. These locking bolts are preferably of hollow tube construction and are normally held in a withdrawn position by the springs 42 which are placed within the locking bolts 40 and act between the head 43 and the pin 44 which extends centrally through the slide 41 and likewise through the locking bolt 40. A slot 45 is provided in the locking bolt 40 to allow for its movement in the direction of its axis. The thrust rod 50, having formed upon it a rack 51 which is meshed with the gear 52, is caused by the action of said gear upon the rack to move in the direction of the arrow 53 advancing it into the slide of the adjoining or first aerofoil section, and also acting against the system of locking bolts causing their advance into each respectively adjoining aerofoil section.

The gears 52 are mounted upon the extremities of the shafts 60 and are rotated through the worms 61 and worm wheels 62; these worms being mounted upon a shaft 63 which is rotated by a hand-wheel 64 which is located in the cock-pit 65 of the fuselage.

As the locking bolts are advanced the lug 70 advances upon the incline 71 formed upon the handle 72 of the catch plate 34, and in mounting the incline forces the handle downward, this movement causing the plate 34 to act around the fulcrum 73 and thereby lifting the hooked end 36. The catch plate 35 is pivoted on and secured by the screw 74, and has imparted to it by the spring 75 a rotative tendency in the direction of the arrow 76, and upon the end 36 being raised the hooked end 37 of the catch plate 35 is allowed to move under the end 36 as shown by the dotted lines 77 in Fig. 7. This leaves the catch plates in an inoperative position in order that when the locking bolts are withdrawn it will be possible for the aerofoil sections to fold between the struts as they are retracted. The catch plate 34 is secured by the screw 80 and the screw 81 around which is placed the spring 82 which normally holds the catch plate against the flange 83 of the spar member 84 which is preferably of I beam type and made of one of the lately developed high stress metals.

Having thus presented and described the embodied form of my invention I desire to obtain Letters Patent for same, and as there are various modes of applications I intend to vary its form of application to the fullest extent of the following stated claims.

As my invention I claim:

1. In an aeroplane; a fuselage; a wing secured to and projecting laterally from one side of said fuselage; a similar wing secured to and projecting laterally from the other side of said fuselage; hinges in each of said wings about which they may be folded into parallel sections; locking means at each hinge; means by which an aviator in said fuselage may actuate said locking means; and means by which an aviator in said fuselage may so fold said wings.

2. In an aeroplane; two wings, one above the other extending outwardly from the fuselage, said wings being divided into a plurality of panels; hinges at the point of juncture of said panels; struts connecting the hinge points on said upper plane with the hinge points on said lower plane, the struts connecting onto every other hinge point; and means for pivoting the centers of these struts together.

3. In an aeroplane; a pair of wings each comprising a series of surfaces hinged together along lines parallel to the line of flight; a primary link pivoted at its inner end on a fixed pin forming the first hinge of the upper wing and pivoted at its outer end to the second hinge joint of the lower plane; a secondary link pivoted at its outer end to the second hinge of the upper wing and pivoted at its center to the center of said primary link; a block on which said secondary link is pivoted and means for moving said block to fold and open said wings.

4. In an aeroplane; a pair of wings, each comprising a series of surfaces hinged together along lines parallel to the line of flight; a primary link pivoted at its inner end on a fixed pin forming the first hinge of the upper wing and pivoted at its outer end in the second hinge joint of the lower plane; a secondary link pivoted at its outer end to the second hinge of the upper wing and pivoted at its center to the center of said primary link; a block in which said secondary link is pivoted; means for guiding said block along a line at right angles to the line of flight; means for moving said block to open and close wings.

5. In an aeroplane; a fuselage; wings secured thereto; hinges in each of said wings about which they may be folded into parallel sections; locking means at each hinge; means by which an aviator in said fuselage may actuate said locking means; means by which an aviator in said fuselage may so fold said wings.

In witness whereof, I hereunto set my hand in the presence of two subscribing witnesses, this 31st day of May, 1922.

VIRGIL MOORE.

Witnesses:
HARRY F. BURKE,
NAOMIA GRAY.